(12) United States Patent
Lim

(10) Patent No.: US 11,336,099 B2
(45) Date of Patent: May 17, 2022

(54) PHOTOVOLTAIC SYSTEM AND CONTROL METHOD THEREFOR

(71) Applicant: LS ELECTRIC CO., LTD., Anyang-si (KR)

(72) Inventor: Ju Ho Lim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 17/266,832

(22) PCT Filed: Jul. 24, 2019

(86) PCT No.: PCT/KR2019/009131
§ 371 (c)(1),
(2) Date: Feb. 8, 2021

(87) PCT Pub. No.: WO2020/032433
PCT Pub. Date: Feb. 13, 2020

(65) Prior Publication Data
US 2021/0351591 A1  Nov. 11, 2021

(30) Foreign Application Priority Data

Aug. 9, 2018  (KR) .................. 10-2018-0093021

(51) Int. Cl.
*H02J 3/38* (2006.01)
*H02S 40/38* (2014.01)
(Continued)

(52) U.S. Cl.
CPC .............. *H02J 3/381* (2013.01); *H02J 7/35* (2013.01); *H02S 40/38* (2014.12); *H02S 50/00* (2013.01); *H02J 2300/24* (2020.01)

(58) Field of Classification Search
CPC ...... H02J 3/381; H02J 3/38; H02J 7/35; H02J 2300/24; H02S 40/38
See application file for complete search history.

(56) References Cited

U.S. PATENT DOCUMENTS

2011/0080134 A1    4/2011  Miller

FOREIGN PATENT DOCUMENTS

JP    2007330057 A    12/2007
JP    2013223323 A    10/2013
(Continued)

OTHER PUBLICATIONS

International Search Report for related International Application No. PCT/KR2019/009131; dated Nov. 6, 2019—2 Pages.
(Continued)

*Primary Examiner* — Robert L Deberadinis
(74) *Attorney, Agent, or Firm* — K&L Gates LLP

(57) ABSTRACT

A photovoltaic system and a control method therefor are disclosed. A photovoltaic system according to an embodiment of the present disclosure comprises: a solar cell array for converting solar energy into electric power; a power management device for monitoring the power generation amount of the solar cell array and the reverse power from an external power grid; an energy storage device charged by receiving the electric power produced by the solar cell array or the power of the external power grid; and a power control device for supplying, to the energy storage device, the electric power generated by the solar cell array or the power of the external power grid in response to a valid power command, wherein the power management device generates the valid power command which has different values according to whether the reverse power is generated by the external power grid.

9 Claims, 2 Drawing Sheets

(51) Int. Cl.
*H02J 7/35* (2006.01)
*H02S 50/00* (2014.01)

(56) References Cited

FOREIGN PATENT DOCUMENTS

| | | |
|---|---|---|
| JP | 5799210 B2 | 10/2015 |
| JP | 2015186427 A | 10/2015 |
| JP | 2015223041 A | 12/2015 |
| KR | 20120068489 A | 6/2012 |
| KR | 20130074046 A | 7/2013 |
| KR | 20140065199 A | 5/2014 |
| KR | 20170031327 A | 3/2017 |

OTHER PUBLICATIONS

Korean Office Action for related Korean Application No. 10-2018-0093021; action dated Jun. 17, 2021; (5 pages).

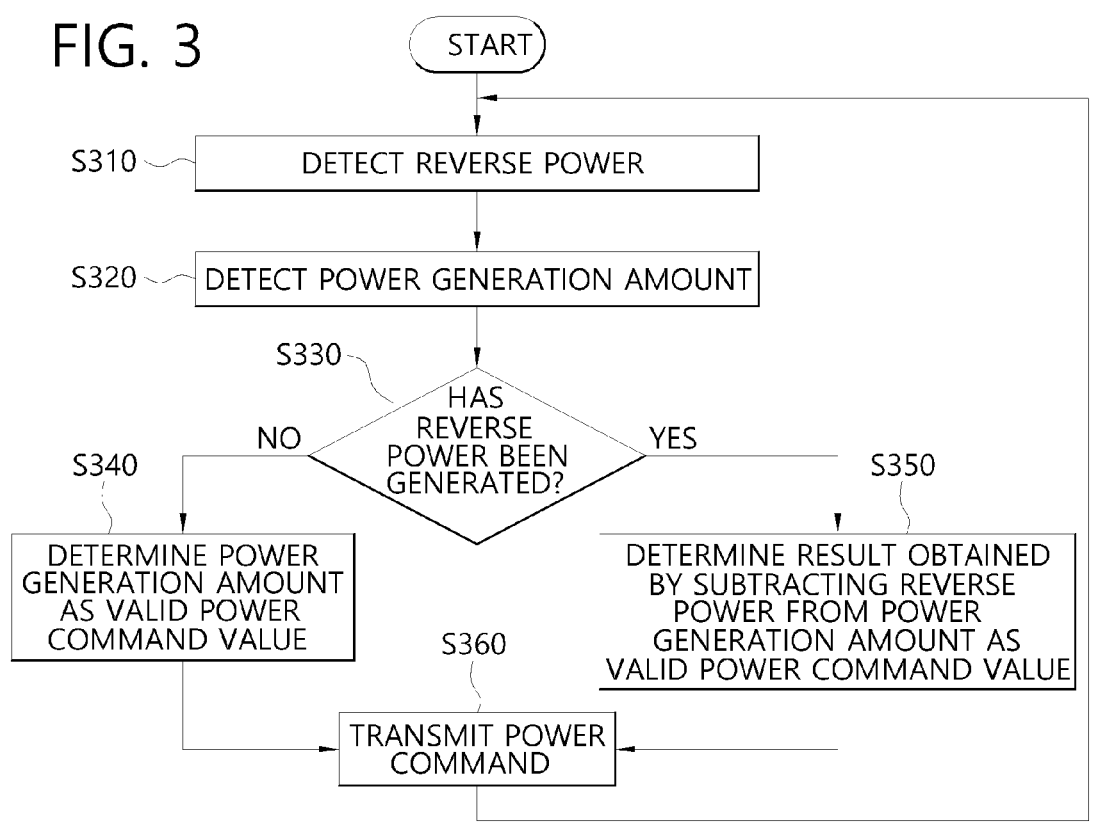

PHOTOVOLTAIC SYSTEM AND CONTROL METHOD THEREFOR

CROSS-REFERENCE TO RELATED APPLICATIONS

The present application is a National Stage of International Application No. PCT/KR2019/009131, filed on Jul. 24, 2019, which claims the benefit of earlier filing date and right of priority to Korean Application No. 10-2018-0093021 filed on Apr. 30, 2018, the contents of which are all hereby incorporated by reference herein in their entirety.

TECHNICAL FIELD

The present disclosure relates to a photovoltaic system and a control method thereof, and more specifically, to a photovoltaic system capable of maximizing charging and discharging efficiency by removing a margin when a valid power command is given, and a control method thereof.

BACKGROUND

Due to concerns about the depletion of fossil energy such as petroleum and about environmental pollution, there is a growing interest in alternative energies. Among the alternative energies, solar power generation, which is power generation that is electricity generation on a large scale by using solar energy by spreading panels with solar cells attached thereto on a large scale, has been in the spotlight. In the solar power generation, unlimited and non-polluting solar energy is used, and thus there is an advantage of no fuel cost and no air pollution or waste generation.

Photovoltaic systems include stand-alone photovoltaic systems and grid-connected photovoltaic systems. The grid-connected photovoltaic system is a system that uses both of electricity obtained from solar power generation and electricity supplied by a power company.

When solar power generation is possible, the grid-connected photovoltaic system supplies electrical energy obtained by power generation to a load, or when solar power generation is impossible, such as at night or in rainy weather, the grid-connected photovoltaic system supplies electrical energy supplied from an external power grid, which is a power grid of a power company, to a load.

Unlike the stand-alone photovoltaic system, in the grid-connected photovoltaic system, a storage battery may be omitted and surplus energy of electrical energy obtained by solar power generation may be transmitted to an external power grid.

The grid-connected photovoltaic system may include an energy storage device, such as a storage battery, a large-capacity energy storage system (ESS), or the like.

It is possible to increase efficiency by storing idle power in the energy storage device when light-loaded and by supplying the power stored in the energy storage device as well as the power obtained by solar power generation to the external power grid when overloaded.

FIG. 1 is a diagram illustrating a conventional photovoltaic system.

A convention solar energy storage system 100 is a system that stores electric energy produced by solar power generation and then supplies the electric energy to an external power grid.

The solar energy storage system 100 converts solar energy into electrical energy to store the converted electrical energy in an energy storage device 140 during a period of time (e.g., a period of time between 10:00 am and 4:00 pm) when power may be generated and discharges electrical energy charged in a battery to supply the discharged electrical energy to an external power grid during a period of time of energy supply which is a period of time other than the period of time of power generation.

When described in detail in terms of operation, electrical energy generated by a solar cell array 120 is detected by a measuring instrument 160 and an amount of power detected by the measuring instrument 160 is monitored by a power management device 110.

When the power management device 110 gives a valid power command to a power control device 130 in consideration of adding a predetermined margin to a power generation amount, the power control device 130 supplies the power to the energy storage device 140 according to the received valid power command to charge the energy storage device 140.

Here, the reason for giving the valid power command in consideration of adding the margin is that, when a value of the valid power command is greater than an amount of electrical energy actually produced by the solar cell array 120, the electrical energy of the external power grid may be used for charging the battery, resulting in cost loss.

Meanwhile, when a very large margin is given, charging and discharging energy efficiency may be reduced because an amount of electrical energy charged into the energy storage device 140 or an amount of electrical energy that may be supplied to the external power grid 150 is reduced.

As described above, there is a problem in that, when the margin is set to be too small, cost loss may occur, and when the margin is set to be too large, charging and discharging energy efficiency may be reduced.

Therefore, there is a need for a system which is capable of improving charging and discharging energy efficiency while reducing cost loss, and a control method thereof.

SUMMARY

The present disclosure is directed to providing a solar energy storage system capable of maximizing charging and discharging efficiency while preventing occurrence of cost loss by controlling a margin when a valid power command is given.

One aspect of the present disclosure provides a photovoltaic system including a solar cell array configured to convert solar energy into power, a power management device configured to monitor a power generation amount of the solar cell array and reverse power received from an external power grid, an energy storage device charged by receiving power produced by the solar cell array or power of the external power grid, and a power control device configured to supply the power produced by the solar cell array or the power of the external power grid to the energy storage device in response to a valid power command. The power management device generates a valid power command which has a value different depending on whether the reverse power of the external power grid is generated.

The photovoltaic system may further include a first measuring instrument configured to detect the power generation amount of the solar cell array, and a second measuring instrument configured to detect the reverse power of the external power grid.

In this case, when the reverse power is not generated, the power management device may determine that the power generation amount of the solar cell array is a value of the valid power command.

Meanwhile, when the reverse power is generated, the power management device may determine that a value obtained by subtracting a value of the reverse power from the power generation amount of the solar cell array is the value of the valid power command.

Meanwhile, the power management device may determine the valid power command at each set time interval on the basis of the reverse power of the external power grid and the power generation amount of the solar cell array and transmit the determined valid power command to the power control device.

Another aspect of the present disclosure provides a control method of a photovoltaic system, which includes monitoring, by a power management device, a power generation amount of power converted by absorbing solar energy and monitoring reverse power received from an external power grid, transmitting, by the power management device, a power command to a power control device on the basis of the reverse power of the external power grid and the power generation amount, supplying, by the power control device, power generated by the photovoltaic device to an energy storage device in response to the power command, and charging the supplied power into the energy storage device.

In this case, the transmitting of the power command may include generating the power command without giving a margin to the power generation amount.

Meanwhile, the transmitting of the power command may include determining whether the reverse power is generated and determining the power command according to whether the reverse power is generated.

In this case, the transmitting of the power command may further include determining the power generation amount as a value of the power command when the reverse power is not generated.

Meanwhile, the transmitting of the power command may further include determining a value obtained by subtracting a value of the reverse power from the power generation amount as the value of the power command when the reverse power is generated.

Meanwhile, the control method may further include determining, by the power management device, the power command at each preset time interval on the basis of the reverse power of the external power grid and the power generation amount and transmitting the determined power command to the power control device.

In the present disclosure, when there is no reverse power, charging is performed by setting a power generation amount of a photovoltaic system as a value of a power command, and thus charging and discharging efficiency can be maximized. Further, when there is reverse power, charging is performed by setting a value obtained by subtracting a value of the reverse power from the power generation amount of the photovoltaic system as the value of the power command, and thus cost loss can be minimized.

Therefore, the present disclosure has an advantage of maximizing profits by reducing cost loss while maximizing charging and discharging efficiency.

In the present disclosure, the reverse power is monitored at each preset time interval and a valid power command is modified. Therefore, even when the reverse power is generated after a specific time interval has elapsed, the valid power command can be immediately modified in a following time interval by reflecting the generated reverse power.

DESCRIPTION OF DRAWINGS

FIG. 3 is a flowchart illustrating a control method of a photovoltaic system according to an embodiment of the present disclosure.

REFERENCE NUMERALS

Figure 1:
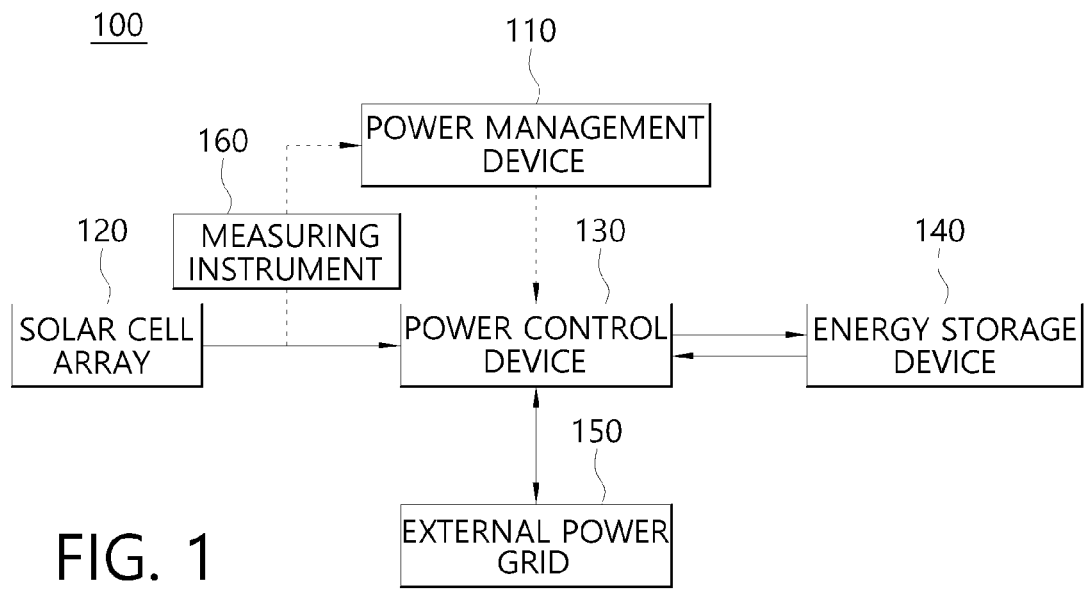
FIG. 1 is a diagram illustrating a conventional photovoltaic system.

11: POWER MANAGEMENT DEVICE
12: SOLAR CELL ARRAY
13: POWER CONTROL DEVICE
14: ENERGY STORAGE DEVICE
15: EXTERNAL POWER GRID
16: FIRST MEASURING INSTRUMENT
17: SECOND MEASURING INSTRUMENT

DETAILED DESCRIPTION

Hereinafter, embodiments of the present disclosure that can be easily performed by those skilled in the art will be described in detail with reference to the accompanying drawings. However, the embodiments of the present disclosure may be implemented in several different forms and are not limited to the embodiments described herein. In addition, parts irrelevant to description are omitted in the accompanying drawings in order to clearly explain the present disclosure. Similar parts are denoted by similar reference numerals throughout this specification.

In addition, when a certain part "includes" a certain component, it means that another component may be further included rather than excluding another component unless otherwise stated.

Figure 2:
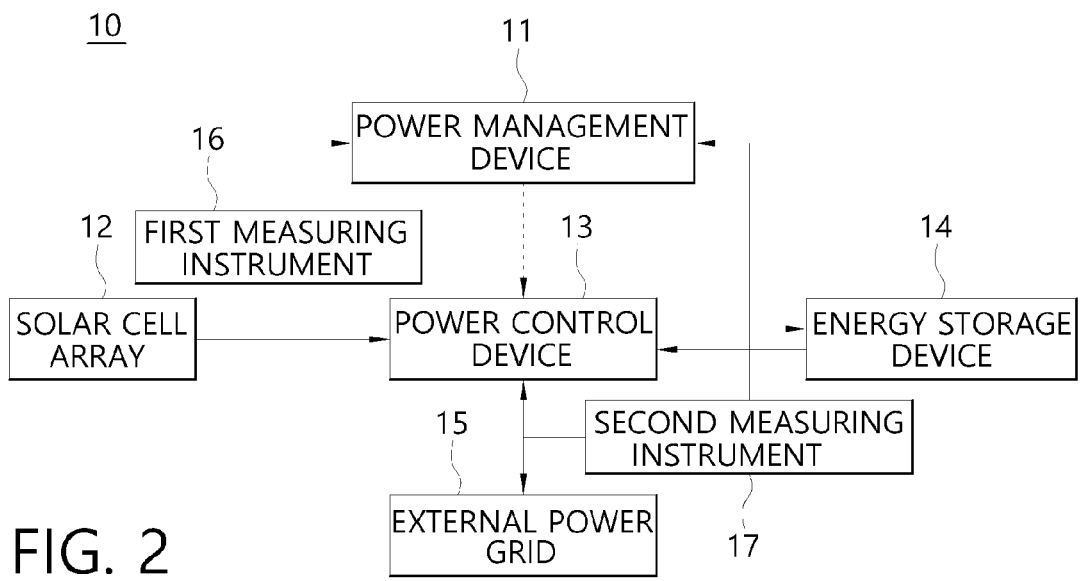
FIG. 2 is a block diagram illustrating a photovoltaic system according to an embodiment of the present disclosure.

FIG. 2 is a block diagram illustrating a photovoltaic system according to an embodiment of the present disclosure.

A photovoltaic system 10 of the present disclosure may include a power management device 11, a solar cell array 12, a power control device 13, an energy storage device 14, a first measuring instrument 16, and a second measuring instrument 17.

Meanwhile, the photovoltaic system 10 of the present disclosure is a grid-connected photovoltaic system and may supply power produced by the solar cell array 12 or power stored in the energy storage device 14 to the external power grid 15.

The solar cell array 12 is formed as a combination of a plurality of solar cell modules.

The solar cell module is a device in which a plurality of solar cells are connected in series or in parallel and which converts solar energy into electrical energy to generate a predetermined voltage and current.

Therefore, the solar cell array 120 may absorb the solar energy and convert the absorbed solar energy into electrical energy, that is, electric power.

The power control device 13 may be used interchangeably with the term "power conditioning system (PCS)."

The power control device 13 may be connected to the solar cell array 12 and the energy storage device 14 to supply the power produced by the solar cell array 12 to the energy storage device 14.

In this case, the power control device 13 may supply the power to the energy storage device in response to a power command generated by the power management device 11.

Further, the power control device 13 may be connected to the external power grid 15 to receive the power from the energy storage device 14 and transmit the power to the external power grid 15.

Further, the power control device 13 may receive the power from the solar cell array 12 to supply the power to the external power grid 15.

Meanwhile, the power control device 13 may convert and transmit electrical characteristics of input power.

For example, the power control device 13 may convert electrical characteristics of the received power, such as converting direct current (DC) power into alternating current (AC) power, changing a frequency of power, or the like.

The energy storage device 14 may be used interchangeably with the term "energy storage system (ESS)."

The energy storage device 400 may include a storage battery.

In addition, the power supplied from the power control device may be charged in the energy storage device 14.

Further, the charged power may be discharged from the energy storage device 14. In this case, the discharged power may be supplied to the external power grid 15 through the power control device 13.

The first measuring instrument 16 may detect a power generation amount of the solar cell array 12, that is, an amount of power generated by the solar cell array 12, and transmit a result of the detection to the power management device 11.

Meanwhile, the second measuring instrument 17 may be installed in a connection portion with the external power grid 15 to detect reverse power.

Here, the reverse power may refer to power supplied from the external power grid 15 to the photovoltaic system 10 of the present disclosure.

Specifically, the photovoltaic system 10 may supply the power to the external power grid 15 or may receive the power from the external power grid 15 to store the received power in the energy storage device 14.

The power supplied from the external power grid 15 to the power control device 13 may be referred to as reverse power.

The power management device 11 may be used interchangeably with the term "power management system (PMS)."

The power management device 11 may control an overall operation of the photovoltaic system 10.

In this case, the power management device 11 may receive a command from the EMS, which is an upper system, and control the operation of the photovoltaic system 10 according to the received command.

Further, the power management device 11 may collect pieces of status information of the solar cell array 12, the power control device 13, and the energy storage device 14, which are its own systems or lower systems, and transmit the pieces of status information to the EMS.

Further, the power management device 11 may monitor the power generation amount of the solar cell array 12 using the detection result received from the first measuring instrument 16.

Further, the power management device 11 may monitor the reverse power supplied from the external power grid 15 using a detection result received from the second measuring instrument 17.

Further, the power management device 11 may transmit a control command to the power control device 13.

Here, the control command may include a power command.

The power command may be used interchangeably with the term "valid power command" and may indicate a valid power value to be stored in the energy storage device 14.

Meanwhile, all or some of the electrical energy produced by the solar cell array 12 may be stored in the energy storage device 14 or transmitted to the external power grid 15.

The power management device 13 generates a valid power command on the basis of the power generation amount of the solar cell array 12, which is detected by the first measuring instrument 16.

In this case, a predetermined margin is added to the detected power generation amount, some amount of the generated power is charged in the energy storage device 14, and some other amount of the generated power is transmitted to the external power grid 15.

The reason for giving the margin is that the energy storage device 14 may be prevented from being charged using the power of the external power grid 15 only when the valid power command that is less than the actually detected power generation amount is given.

That is, the energy storage device 14 should be charged as much as a value of the valid power command. However, when the power generation amount of the solar cell array 12 is less than the valid power command, the energy storage device 14 is charged by receiving the power of the external power grid 15.

Therefore, cost loss may occur and thus the margin is given to prevent the cost loss.

Further, when the margin is too large, the amount of power charged to the energy storage device is reduced and thus charging and discharging efficiency may be lowered. Accordingly, an amount of energy that may be supplied to the external power grid 15 is reduced.

When energy produced by solar power generation is stored in the energy storage device 14 and then sold to the external power grid 15 during a period of time (e.g., a period of time before 10:00 am or after 4:00 pm) of no power generation, it is very advantageous because the produced energy may be sold at a cost of five times a weight of Renewable Energy Certificates (RECs) according to Korean laws.

Therefore, during a period of time other than a period of time between 10:00 am and 4:00 pm, the power produced by and stored in the photovoltaic system 10 is transmitted to the external power grid 15. However, when the margin is too large, an amount of energy that may be sold to the external power grid 15 may be reduced and thus profits may not be maximized.

According to the present disclosure, it is possible to increase the charging and discharging efficiency while preventing occurrence of cost loss by controlling the valid power command.

A control method of the photovoltaic system of the present disclosure will be described in detail with reference to a flowchart of FIG. 3.

FIG. 3 is a flowchart illustrating a control method of a photovoltaic system according to an embodiment of the present disclosure.

Conventionally, a power management device generates a valid power command only based on a power generation amount of a solar cell array. However, in the present disclosure, a valid power command may be generated in consideration of both of reverse power of an external power grid 15 and a power generation amount of a solar cell array 12.

Specifically, a second measuring instrument 17 detects reverse power of a power line which connects a power control device 13 to the external power grid 15 (S310).

In addition, a value of the reverse power detected by the second measuring instrument 17 is transmitted to a power management device 11.

Further, a first measuring instrument 16 detects the power generation amount of the solar cell array 12 (S320).

The first measuring instrument 16 transmits information about the detected power generation amount to the power management device 11.

Next, the power management device 11 determines whether the reverse power is generated on the basis of a detection result received from the second measuring instrument 17 (S330).

In addition, the power management device 11 may determine a valid power command according to whether the reverse power is generated.

Specifically, when it is determined that the reverse power is not generated, the power management device 11 determines that the power generation amount of the solar cell array 12 detected by the first measuring instrument 16 is a value of the valid power command (S340).

More specifically, when it is determined that the reverse power is not generated, the power management device 11 may substitute the power generation amount of the solar cell array 12 without change in setting the value of the valid power command.

Meanwhile, when the reverse power is detected by the second measuring instrument 17, the power management device 11 may determine that a value obtained by subtracting the value of the reverse power detected by the second measuring instrument 17 from the power generation amount of the solar cell array 12 detected by the first measuring instrument 16 is the value of the valid power command (S350).

Specifically, as a result of the detection performed by the second measuring instrument 17, when it is determined that the reverse power is generated, the power management device 11 may reflect the value obtained by subtracting the value of the reverse power, which is supplied to the power control device 13 from the external power grid 15 and detected by the second measuring instrument 17, from the power generation amount of the solar cell array 12 detected by the first measuring instrument 16 without change in setting the value of the valid power command.

Meanwhile, when the valid power command is generated, the power management device 11 transmits the power command to the power control device 13 (S360).

In this case, the power control device 13 supplies the power to the energy storage device 14 in response to the received valid power command.

Specifically, the power control device 13 may supply the power to the energy storage device 14 so that the energy storage device 14 is charged by an amount of power set in the valid power command.

That is, in the present disclosure, when there is no reverse power, charging may be performed by setting the power generation amount of the solar cell array 12 as the value of the valid power command, and thus charging and discharging efficiency may be maximized.

Further, when the reverse power is present, charging may be performed by setting the value obtained by subtracting the value of the reverse power from the power generation amount of the solar cell array 12 as the value of the valid power command, and thus the reverse power may be prevented from being further generated so that cost loss may be minimized.

Therefore, the present disclosure has an advantage of maximizing profits by reducing cost loss while maximizing charging and discharging efficiency.

Meanwhile, the process of transmitting the valid power command on the basis of the reverse power of the external power grid 15 and the power generation amount of the solar cell array 12 may be continuously repeated while a photovoltaic system 10 is operated.

Further, the power management device 11 may determine the power command at each preset time interval on the basis of the reverse power of the external power grid 15 and the power generation amount of the solar cell array 12 and transmit the determined power command to the power control device 13.

For example, the power management device 11 may generate and transmit the valid power command every 500 ms.

Further, the first measuring instrument 16 and the second measuring instrument 17 may output the detection results at each predetermined time interval, and the power management device 11 may determine the power command at each preset time interval on the basis of the reverse power of the external power grid 15 and the power generation amount of the solar cell array 12 and transmit the determined valid power command to the power control device 13.

For example, the first measuring instrument 16 and the second measuring instrument 17 may output the detection results every 500 ms, and the power management device 11 may generate and transmit a valid power command every one second according to the detection results of the first measuring instrument 16 and the second measuring instrument 17.

That is, in the present disclosure, the reverse power is monitored at each preset time interval and the valid power command is modified. Therefore, even when the reverse power is generated after a specific time interval has elapsed, the valid power command may be immediately modified in a following time interval by reflecting the generated reverse power.

For example, in the case in which the valid power command is generated every 500 ms, a phenomenon in which the reverse power is generated every 500 ms may be eliminated, and thus cost loss may be minimized.

Features, structures, and effects described in the above-described embodiments are included in at least one embodiment of the present disclosure but are not limited to only one embodiment.

Further, features, structures, and effects exemplified in each embodiment may be embodied by being combined with another embodiment or modified by those skilled in the art. It should be interpreted that the combined and modified contents are included in the scope of the present disclosure.

While the present disclosure has been particularly described with reference to the embodiments, the embodiments are only the exemplary embodiments of the present disclosure and the present disclosure is not intended to be limited thereto. It will be understood by those skilled in the art that modifications and applications in other forms may be made without departing from the spirit and scope of the present disclosure. For example, each component specifically shown in the embodiments may be modified and embodied. In addition, it should be understood that differences related to these modifications and applications are within the scope of the present disclosure as defined in the appended claims.

The present disclosure has industrial applicability as a technique for converting and storing solar energy into electrical energy and controlling power supply using natural law

The invention claimed is:

1. A photovoltaic system comprising:
   a solar cell array configured to convert solar energy into power;
   a power management device configured to monitor a power generation amount of the solar cell array and reverse power received from an external power grid;
   an energy storage device charged by receiving power produced by the solar cell array or power of the external power grid; and
   a power control device configured to supply the power produced by the solar cell array or the power of the external power grid to the energy storage device in response to a valid power command,
   wherein the power management device generates the valid power command which has a value different depending on whether the reverse power of the external power grid is generated.

2. The photovoltaic system of claim 1, further comprising:
   a first measuring instrument configured to detect the power generation amount of the solar cell array; and
   a second measuring instrument configured to detect the reverse power of the external power grid.

3. The photovoltaic system of claim 2, wherein, when the reverse power is not generated, the power management device determines that the power generation amount of the solar cell array is a value of the valid power command.

4. The photovoltaic system of claim 2, wherein, when the reverse power is generated, the power management device determines that a value obtained by subtracting a value of the reverse power from the power generation amount of the solar cell array is a value of the valid power command.

5. The photovoltaic system of claim 2, wherein the power management device determines the valid power command at each set time interval on the basis of the reverse power of the external power grid and the power generation amount of the solar cell array and transmits the determined valid power command to the power control device.

6. A control method of a photovoltaic system, the control method comprising:
   monitoring, by a power management device, a power generation amount of a solar cell array which converts solar energy into power and monitoring reverse power of an external power grid;
   transmitting, by the power management device, a valid power command, which is generated based on the power generation amount of the solar cell array, according to whether the reverse power of the external power grid is present;
   supplying, by a power control device, power generated by the solar cell array to an energy storage device in response to the valid power command; and
   charging the energy storage device with the supplied power.

7. The control method of claim 6, wherein, when the reverse power is not generated, it is determined that the power generation amount of the solar cell array is a value of the valid power command.

8. The control method of claim 6, wherein, when the reverse power is generated, it is determined that a value obtained by subtracting a value of the reverse power from the power generation amount of the solar cell array is a value of the valid power command.

9. The control method of claim 6, wherein:
   the valid power command is determined by the power management device at each preset time interval on the basis of the reverse power of the external power grid and the power generation amount of the solar cell array; and
   the determined valid power command is transmitted to the power control device.

* * * * *